Patented July 4, 1950

2,513,270

UNITED STATES PATENT OFFICE 2,513,270

PRODUCTION OF 2-IMINOPIPERIDINES AND 2-IMINOPYRROLIDINES

Frederick F. Blicke, Ann Arbor, Mich., assignor to The Regents of the University of Michigan, Ann Arbor, Mich., a corporation of Michigan No Drawing. Application April 7, 1947, Serial No. 739,949

5 Claims. (Cl. 260—293)

This invention relates to a method for producing nitrogenous heterocyclic compounds. More particularly, the invention relates to a new process for obtaining hydrohalide acid addition salts of compounds of the formula,

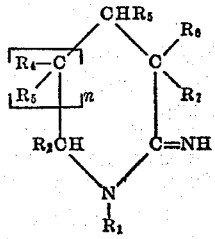

where $R_1$ is a lower alkyl or aralkyl radical, $R_2$, $R_3$, $R_4$ and $R_5$ are the same or different and represent hydrogen or a lower alkyl radical, $R_6$ is a phenyl or α-thienyl radical, $R_7$ is hydrogen, lower alkyl, phenyl or an α-thienyl radical and $n$ is zero or one.

In accordance with the present invention, compounds of the above formula are produced in good yields by heating a substituted aminoalkyl acetonitrile of the formula,

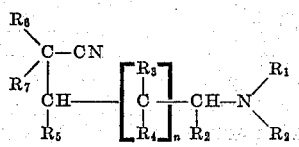

or its HX acid addition salt with gaseous hydrogen chloride or bromide at a temperature between about 125 and 200° C. to obtain an imidohalide hydrohalide of the formula,

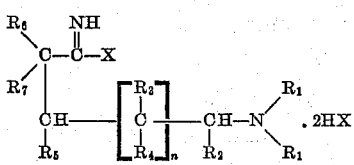

which on subsequent heating at a temperature of between about 225 and 350° C. is converted to the HX acid addition salt of the desired substituted 2-imino- nitrogen heterocyclic compound, where $R_1$, $R_2$, $R_3$, $R_4$, $R_5$, $R_6$, $R_7$ and $n$ have the same significance as given above and X is chlorine or bromine.

In the practice of my invention I prefer to carry out the initial heating at a temperature between about 160 and 170° C. and the conversion of the imidohalide hydrohalide to the desired HX acid addition salt at about 265 to 285° C. since at such temperatures the reaction proceeds quite rapidly and with very little undesirable decomposition of either the starting materials or the products.

The compounds of the present invention are useful as intermediates in the synthesis of other chemical compounds and, in particular, compounds exhibiting pharmacological activity.

The invention is illustrated by the following examples.

Example 1

A stream of hydrogen chloride gas is passed into 10 g. of phenyl-β-dimethylaminoethylacetonitrile, heated at about 160° C. for about five to ten minutes. The nitrile solidifies due to the formation of the hydrochloride and then the salt melts as it is converted into the imidochloride dihydrochloride. The temperature is raised gradually to 270 to 275° C. and maintained at this point for five to ten minutes. The viscous red oil is cooled, stirred with acetone and the desired 1-methyl-2-imino-3-phenylpyrrolidine hydrochloride collected. The crude salt may be recrystallized from isopropanol to obtain the pure hydrochloride melting at 216–18° C.

Example 2

Hydrogen bromide gas is passed into 25 g. of phenyl - β - di - n - butylaminoethylacetonitrile heated to about 165° C. until the solid hydrobromide salt that is formed remelts due to the formation of the imidobromide dihydrobromide. The temperature is raised gradually to about 275° C. and maintained at this point for five to ten minutes. The reaction mixture is cooled, stirred with acetone and the solid 1-n-butyl-2-imino-3-phenylpyrrolidine hydrobromide collected and purified by recrystallization from isopropanol.

Example 3

A stream of hydrogen chloride gas is passed into 10 g. of diphenyl-β-diethylaminoethylacetonitrile, heated at 160° C. for about five to ten minutes. The nitrile solidifies due to the formation of the hydrochloride and then the salt melts due to the formation of the imidochloride dihydrochloride. The temperature is raised gradually to between about 270 to 275° C. and maintained at this point for five to ten minutes. The viscous red oil is cooled and then stirred with acetone. When crystallization is complete the 1-ethyl-2-imino-3,3-diphenylpyrrolidine hydrochloride is collected, washed with acetone and recrystallized from isopropanol; M. P. 262–4° C.

The free base of 1-ethyl-2-imino-3,3-diphenyl-pyrrolidine can be obtained by adding ammonia water to an aqueous solution of the hydrochloride salt. The precipitated base can be purified by recrystallization from petroleum ether.

*Example 4*

Hydrogen chloride gas is passed into 25 g. of diphenyl - ($\alpha$ - ethyl - $\beta$ - dimethylamino)ethyl-acetonitrile for about ten minutes while keeping the temperature of the mixture at about 165° C. At the end of this time the temperature is gradually raised to about 275° C. and maintained at this point for about ten minutes. The mixture is cooled, stirred with acetone and the hydrochloride salt of 1-methyl-2-imino-3,3-diphenyl-4-ethylpyrrolidine collected and purified by recrystallization from isopropanol.

The free base of this pyrrolidine compound is obtained by dissolving the hydrochloride salt in water and adding an excess of sodium hydroxide solution. The base is extracted with ether, the ether extracts dried and the ether distilled. The residue consists of the desired free base of 1-methyl-2-imino-3,3-diphenyl-4-ethylpyrrolidine.

*Example 5*

A stream of hydrogen chloride gas is passed into 25 g. of melted phenyl-ethyl-($\beta$-methyl-$\beta$-di-n-propylamino)ethylacetonitrile for about five to ten minutes and then the temperature of the mixture gradually raised to about 275° C. and maintained at this point for about ten minutes. The mixture is cooled, stirred with acetone and the desired hydrochloride salt collected. On recrystallization from isopropanol the pure hydrochloride salt of 1-n-propyl-2-imino-3-ethyl-3-phenyl-5-methylpyrrolidine is obtained as a white crystalline solid.

*Example 6*

15 g. of di-$\alpha$-thienyl-$\beta$-diethylaminoethyl-acetonitrile is heated to about 175° C. and dry hydrogen chloride gas passed into the molten mixture for about ten minutes. The temperature is then raised gradually to about 275° C. and maintained at this point for about ten minutes. The reaction mixture is cooled and the residue stirred with acetone. The hydrochloride salt of the 1-ethyl-2-imino-3,3-di-$\alpha$-thienylpyrrolidine which fails to dissolve is collected and purified by recrystallization from isopropanol.

*Example 7*

A stream of hydrogen chloride is passed into 23.5 g. of phenyl-$\gamma$-di-n-butylaminopropylaceto-nitrile, at about 165° C. for about five to ten minutes and then the temperature gradually raised to about 275° C. The temperature is maintained at this latter point for about ten minutes and then the mixture cooled. The residue is stirred with acetone and the insoluble 1-butyl-2-imino-3-phenylpiperidine hydrochloride collected and purified by recrystallization from isopropanol; M. P. 192–4° C.

*Example 8*

Dry hydrogen bromide gas is passed into 20 g. of diphenyl - ($\beta,\beta$ - dimethyl - $\gamma$ - diethylamino-propyl)acetonitrile at 165° C. for about ten minutes. The temperature of the reaction mixture is raised slowly to 270 to 275° C. and maintained at this point for about ten minutes. The somewhat viscous residue is cooled, stirred with acetone and the crude hydrobromide salt of 1-ethyl-2-imino-3,3-diphenyl-5,5-dimethylpiperidine removed by filtration. The crude salt can be purified, if desired, by recrystallization from isopropanol.

*Example 9*

A stream of hydrogen chloride gas is passed into 25 g. of phenyl-ethyl-($\alpha$-ethyl-$\gamma$-dimethyl-aminopropyl)acetonitrile heated at about 165° C. After about ten minutes the temperature of the mixture is raised to about 270 to 275° C. and maintained at this point for an additional ten minutes. The reaction mass is cooled, stirred with acetone and the insoluble hydrochloride salt of 1-methyl-2-imino-3-ethyl-3-phenyl-4-ethyl-piperidine removed by filtration. After recrystallization from isopropanol the pure salt is obtained as a white crystalline solid.

*Example 10*

25 g. of di-$\alpha$-thienyl-($\beta$-methyl-$\gamma$-di-n-propyl-aminobutyl)acetonitrile is heated to about 175° C. and dry hydrogen chloride gas passed into the molten mixture for about ten minutes. The temperature is then raised gradually to about 270° C. and maintained at this point for about ten minutes. The reaction mixture is cooled and the residue stirred with acetone. The hydrochloride salt of the 1-n-propyl-2-imino-3,3-di-$\alpha$-thienyl-5,6-dimethylpiperidine which fails to dissolve is collected and purified by recrystallization from isopropanol.

Some examples of other 2-imino-pyrrolidines and -piperidines which can be prepared in the same manner as described above are:

1. 1-benzyl-2-imino-3-phenylpyrrolidine.
2. 1 - methyl - 2 - imino - 3 - ethyl-3-$\alpha$-thienyl-pyrrolidine.
3. 1 - methyl - 2 - imino - 3 - $\alpha$ - thienyl-5-methylpyrrolidine.
4. 1-benzyl-2-imino-3-phenylpiperidine.
5. 1-ethyl-2-imino-3-phenyl-4-methylpiperidine.
6. 1-methyl-2-imino-3,3-diphenylpiperidine.
7. 1-ethyl-2-imino-3-$\alpha$-thienylpiperidine.
8. 1 - n - propyl - 2 - imino - 3 - phenyl - 5-ethylpiperidine.

The substituted aminoalkyl acetonitrile compounds used as starting materials may be prepared by the reaction of the corresponding substituted phenyl- or $\alpha$-thienyl-acetonitrile with an appropriate aminoalkyl halide in the presence of sodamide and a solvent such as benzene or toluene.

What I claim as my invention is:

1. Process which comprises heating an aminoalkyl acetonitrile of the class consisting of a free base and its acid addition salts, said free base having the formula,

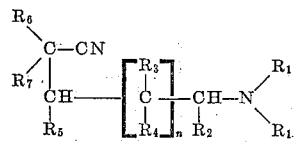

with a hydrohalide of the class consisting of hydrogen chloride and hydrogen bromide, at a temperature between about 125 and 200° C. thereby obtaining an imidohalide hydrohalide of the formula,

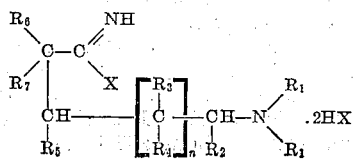

and subsequently heating said imidohalide hydrohalide at a temperature between about 225 and 350° C. to obtain a hydrohalide acid addition salt of a compound of the formula,

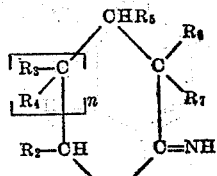

where $R_1$ is a member of the class consisting of lower alkyl and lower phenalkyl radicals, $R_2$, $R_3$, $R_4$ and $R_5$ are members of the class consisting of hydrogen and lower alkyl radicals, $R_6$ is a member of the class consisting of phenyl and $\alpha$-thienyl radicals, $R_7$ is a member of the class consisting of hydrogen, lower alkyl, and phenyl radicals, $n$ remaining constant throughout said process and being a member of the class consisting of zero and one and X is a member of the class consisting of chlorine and bromine.

2. Process which comprises heating an aminoalkyl acetonitrile of the class consisting of a free base and its acid addition salts, said free base having the formula,

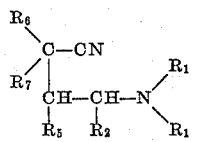

with a hydrohalide of the class consisting of hydrogen chloride and hydrogen bromide, at a temperature between about 125 and 200° C. thereby obtaining an imidohalide hydrohalide of the formula

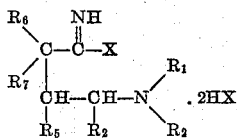

and subsequently heating said imidohalide hydrohalide at a temperature between about 225 and 350° C. to obtain a hydrohalide acid addition salt of a compound of the formula,

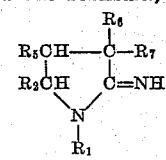

where $R_1$ is a member of the class consisting of lower alkyl and lower phenalkyl radicals, $R_2$ and $R_5$ are members of the class consisting of hydrogen and lower alkyl radicals, $R_6$ is a member of the class consisting of phenyl and $\alpha$-thienyl radicals, $R_7$ is a member of the class consisting of hydrogen, lower alkyl, and phenyl radicals and X is a member of the class consisting of chlorine and bromine.

3. Process which comprises heating an aminoalkyl acetonitrile of the class consisting of a free base and its acid addition salts, said free base having the formula,

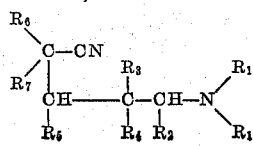

with a hydrohalide of the class consisting of hydrogen chloride and hydrogen bromide, at a temperature between about 125 and 200° C. thereby obtaining an imidohalide hydrohalide of the formula,

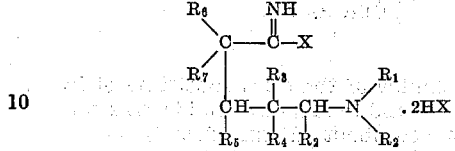

and subsequently heating said imidohalide hydrohalide at a temperature between about 225 and 350° C. to obtain a hydrohalide acid addition salt of a compound of the formula,

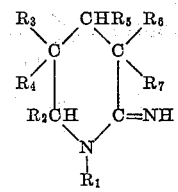

where $R_1$ is a member of the class consisting of lower alkyl and lower phenalkyl radicals, $R_2$, $R_3$, $R_4$ and $R_5$ are members of the class consisting of hydrogen and lower alkyl radicals, $R_6$ is a member of the class consisting of phenyl and $\alpha$-thienyl radicals, $R_7$ is a member of the class consisting of hydrogen, lower alkyl, and phenyl radicals and X is a member of the class consisting of chlorine and bromine.

4. Process which comprises heating an aminoalkyl acetonitrile of the class consisting of a free base and its acid addition salts, said free base having the formula,

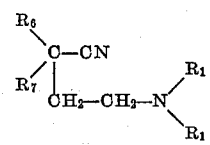

with a hydrohalide of the class consisting of hydrogen chloride and hydrogen bromide, at a temperature between about 125 and 200° C. thereby obtaining an imidohalide hydrohalide of the formula,

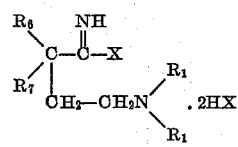

and subsequently heating said imidohalide hydrohalide at a temperature between about 225 and 350° C. to obtain a hydrohalide acid addition salt of a compound of the formula,

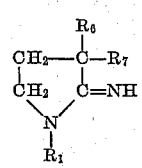

where $R_1$ is a lower alkyl radical, $R_6$ is a phenyl radical, $R_7$ is a member of the class consisting of hydrogen, lower alkyl, and phenyl radicals and X is a member of the class consisting of chlorine and bromine.

5. Process which comprises heating an aminoalkyl acetonitrile of the class consisting of a free base and its acid addition salts, said free base having the formula,

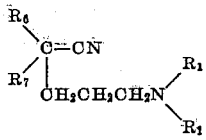

with a hydrohalide of the class consisting of hydrogen chloride and hydrogen bromide, at a temperature between about 125 and 200° C. thereby obtaining an imidohalide hydrohalide of the formula,

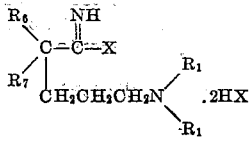

and subsequently heating said imidohalide hydrohalide at a temperature between about 225 and 350° C. to obtain a hydrohalide acid addition salt of a compound of the formula,

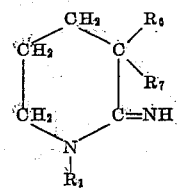

where $R_1$ is a lower alkyl radical, $R_6$ is a phenyl radical, $R_7$ is a member of the class consisting of hydrogen, lower alkyl, and phenyl radicals and X is a member of the class consisting of chlorine and bromine.

FREDERICK F. BLICKE.

No references cited.